(12) United States Patent
Lonergan et al.

(10) Patent No.: US 9,199,720 B2
(45) Date of Patent: Dec. 1, 2015

(54) NON-ROTATING STATIONARY GROUND TUBE FOR A WIND FAIRING

(75) Inventors: Michael C. Lonergan, Milford, CT (US); Fred W. Kohlhepp, Hamden, CT (US); Robert D. Beatty, Trumbull, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 1127 days.

(21) Appl. No.: 13/222,398

(22) Filed: Aug. 31, 2011

(65) Prior Publication Data

US 2013/0052034 A1 Feb. 28, 2013

(51) Int. Cl.
*B64C 7/00* (2006.01)
*B64C 27/10* (2006.01)

(52) U.S. Cl.
CPC .. *B64C 7/00* (2013.01); *B64C 27/10* (2013.01)

(58) Field of Classification Search
CPC .......... B64C 7/00; B64C 27/04; B64C 27/08; B64C 27/10; B64C 27/12; B64C 27/32; B64C 27/33; B64C 27/35; B64C 27/37; B64C 27/48; B64C 11/02; B64C 11/48
USPC ....................................................... 416/244 R
See application file for complete search history.

(56) References Cited

U.S. PATENT DOCUMENTS

| 2,772,745 | A | 12/1956 | Bordoni |
| 5,351,913 | A | 10/1994 | Cycon et al. |
| 5,785,497 | A | 7/1998 | White et al. |
| 6,908,286 | B2 | 6/2005 | Leskow et al. |
| 7,118,340 | B2 | 10/2006 | D'Anna |
| 7,585,153 | B1 | 9/2009 | Schmaling et al. |
| 2009/0084891 | A1* | 4/2009 | Darrow et al. ............. 244/17.19 |

* cited by examiner

*Primary Examiner* — Edward Look
*Assistant Examiner* — Maxime Adjagbe
(74) *Attorney, Agent, or Firm* — Cantor Colburn LLP

(57) ABSTRACT

A stationary ground tube for use in an aircraft rotor fairing includes a first cylindrical portion including a first bore aligned along a longitudinal axis, the cylindrical body portion having a tubular body from a first end to a second end; and a second cylindrical portion coupled to the first cylindrical portion, the second cylindrical portion including a second bore aligned along the longitudinal axis. The second cylindrical portion is coupled to the aircraft rotor fairing via at least one attachment device.

18 Claims, 4 Drawing Sheets

NON-ROTATING STATIONARY GROUND TUBE FOR A WIND FAIRING

FIELD OF INVENTION

The subject matter disclosed herein relates generally to the field of a wind fairing system for use in aircraft, and more particularly, to stationary ground tube which is sized and configured for use with a non-rotating wind fairing in a high-speed rotary-wing aircraft such as a helicopter.

DESCRIPTION OF RELATED ART

Typically, the aerodynamic drag of a dual counter-rotating, coaxial rotor system is generated by three main components—the upper hub, the lower hub, and the interconnecting rotor shaft assembly. The drag contribution may be approximately 40% for each of the hubs, and 20% for the interconnecting shaft assembly.

Currently, the wind fairing for the interconnecting rotor shaft assembly is required to remain stationary while the upper and lower hubs rotate in opposite directions. This requirement results in a complex wind fairing assembly that adds excessive weight to the coaxial rotor system.

BRIEF SUMMARY

According to one aspect of the invention, a wind fairing system for use in a rotor assembly includes an upper hub fairing configured for coupling to an upper hub of the rotor assembly, a lower hub fairing configured for coupling to a lower hub of the rotor assembly, and a wind fairing configured for coupling to a ground tube. The ground tube includes a first portion including a first through aperture aligned along a longitudinal axis, the first portion having a tubular body from an open first end to an opposed second end; and a second portion including a second through aperture from an open third end to an open fourth end, the second through aperture being aligned along the longitudinal axis, and the second portion being coupled to the first portion.

According to another aspect of the invention, a stationary ground tube for a coaxial rotor fairing includes a first portion including a first through aperture aligned along a longitudinal axis, the first portion having a tubular body from an open first end to an opposed second end; and a second portion including a second through aperture from an open third end to an open fourth end, the second through aperture being aligned along the longitudinal axis, with the second portion being coupled to the first portion.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a ground tube in a helicopter for coupling to a co-axial rotor system and receiving a non-rotating wind fairing include a first tubular portion coupled to a second tubular portion, with exemplary embodiments being discussed below in detail. The ground tube, including the tubular portions, is aligned along a longitudinal axis. The ground tube is coupled to a stationary ground frame and includes an interior volume of space to separate the rotating upper rotor assembly and lower rotor assembly. Additionally, one or more openings may be provided for receiving actuators in order to control the collective and cyclic pitch for one or more rotor hubs. By providing a stationary ground tube that remains stationary during flight, additional bearings that are typically needed to keep the wind fairing stationary are eliminated thereby decreasing the weight of the hub fairing system.

Figure 1:
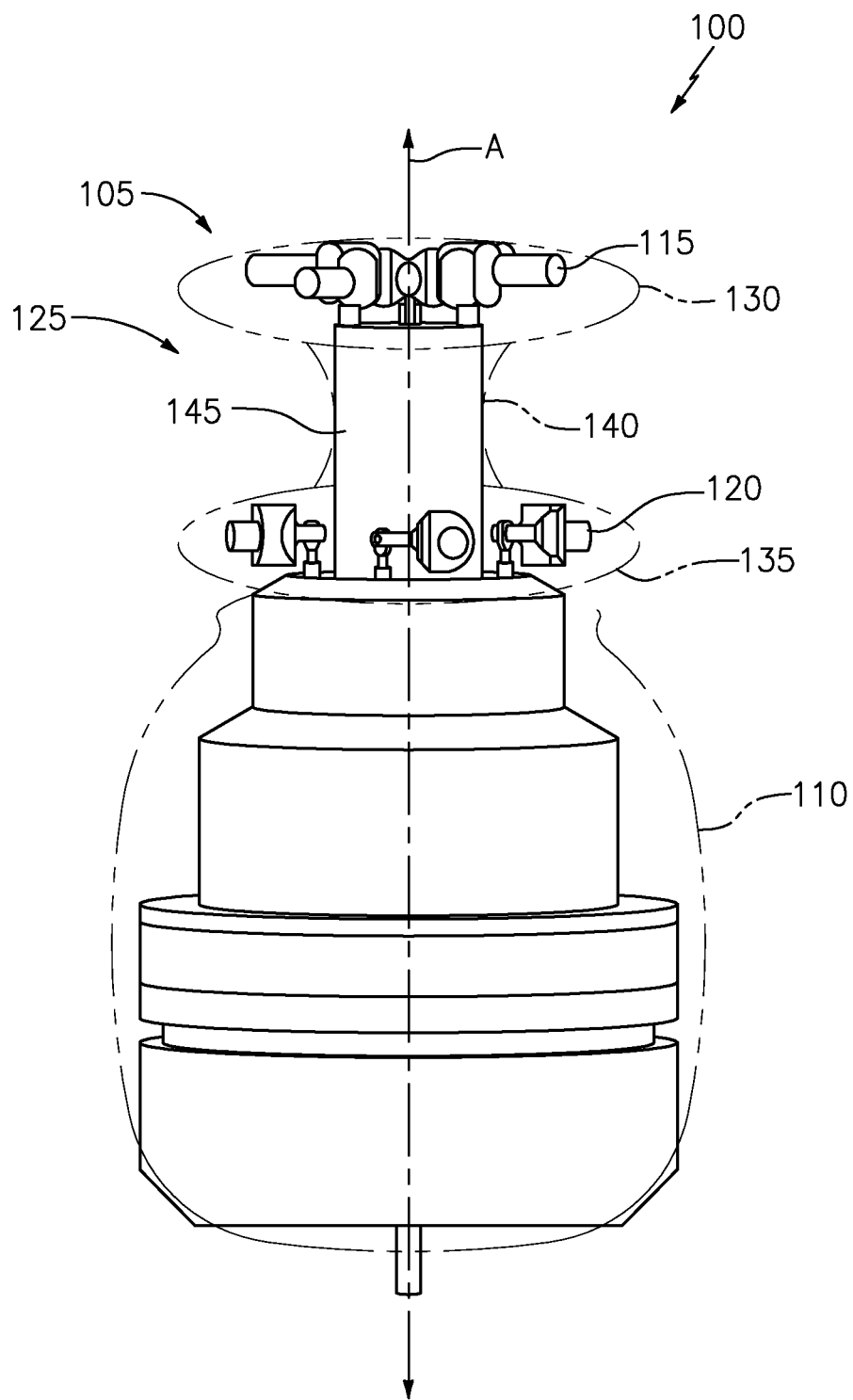
FIG. 1 illustrates a partial phantom front view of an embodiment of a rotary-wing aircraft including a rotor hub fairing system surrounding an inner stationary ground tube.

Referring now to the drawings, FIG. 1 illustrates an exemplary vertical takeoff and landing (VTOL) high-speed rotary-wing aircraft 100 having a dual counter-rotating, coaxial rotor system 105 coupled to a hub fairing system above an aircraft cabin 110. Particularly, the coaxial rotor system 105 includes a plurality of rotor blades (not shown) mounted to an upper rotor hub 115 and a lower rotor hub 120 for rotation about a rotor axis of rotation A. The rotor system 105 is coupled to a hub fairing system 125 to achieve drag reduction of the rotor system during flight. As shown in phantom, the hub fairing system includes an upper hub fairing 130, a lower hub fairing 135, and a wind fairing 140 coupled to a stationary non-rotating ground tube 145. In operation, both of the upper hub fairing 130 and lower hub fairing 135 rotate with the upper rotor hub 115 and lower rotor hub 120 respectively, while the wind fairing 140 being connected to the stationary (or non-rotating) ground tube 145 causes the wind fairing 140 to remain stationary without utilizing rotating bearings to counteract the rotation of the upper and lower hub fairings 130, 135.

Figure 2:
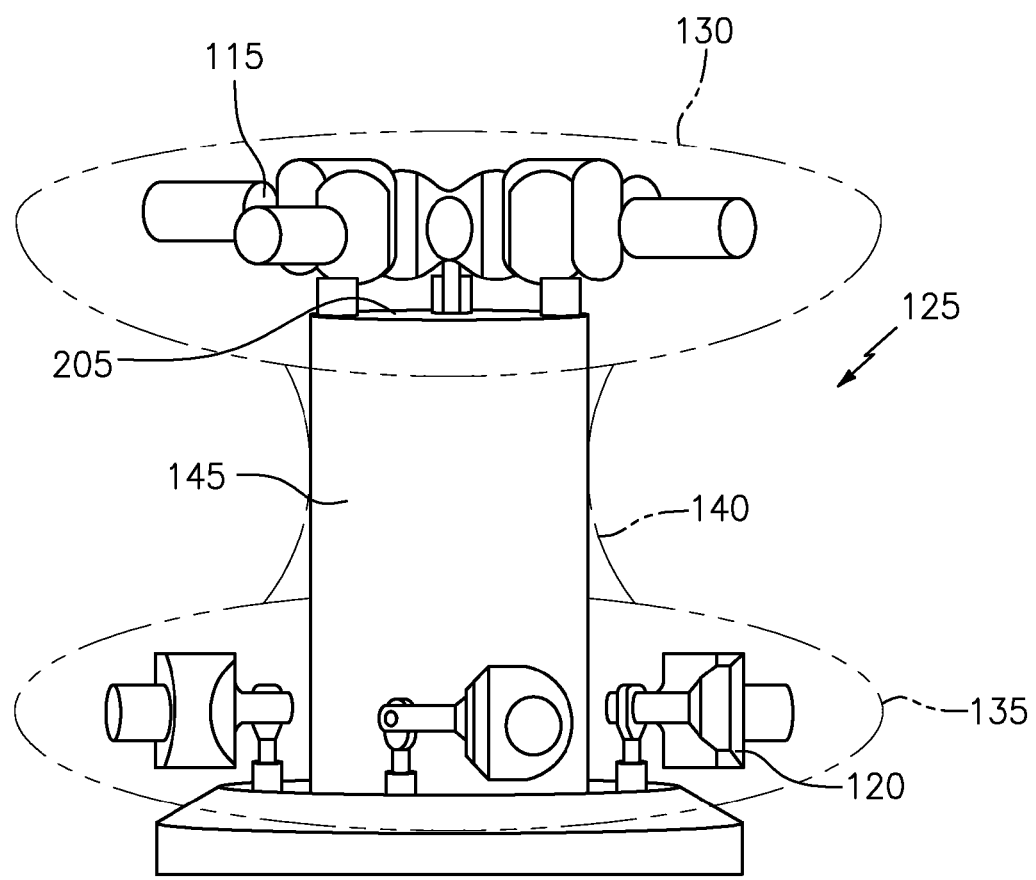
FIG. 2 illustrates a partial phantom front view of an exemplary embodiment shown in FIG. 1 with a detailed view of the wind fairing connected to an inner stationary ground tube.

FIG. 2 illustrates a partial front view of the non-rotating ground tube 145 coupled to a hub fairing system 125 according to an exemplary embodiment of the invention. Particularly, the non-rotating ground tube 145 is coupled to the lower rotor assembly 335 (shown in FIG. 3) and provides a stationary platform for coupling a wind fairing 140 between the upper rotor hub 115 having upper fairing 130 and the lower rotor hub 120 having lower fairing 135. As shown, the wind fairing 140 has a generally hour-glass shape, however, it is to be appreciated that other shapes for the wind fairing 140 may be used without detracting from the scope of the invention. In some exemplary embodiments, the wind fairing 140 is attached to the ground tube 145 via a cross-fastener, pins, or similar types of attachment devices. In operation, the wind fairing 140 is coupled to the stationary (or non-rotating) ground tube 145 and remains stationary during flight as the upper and lower hub fairings 130, 135 rotate with the upper hub 115 and lower hub 120 respectively.

Figure 3:
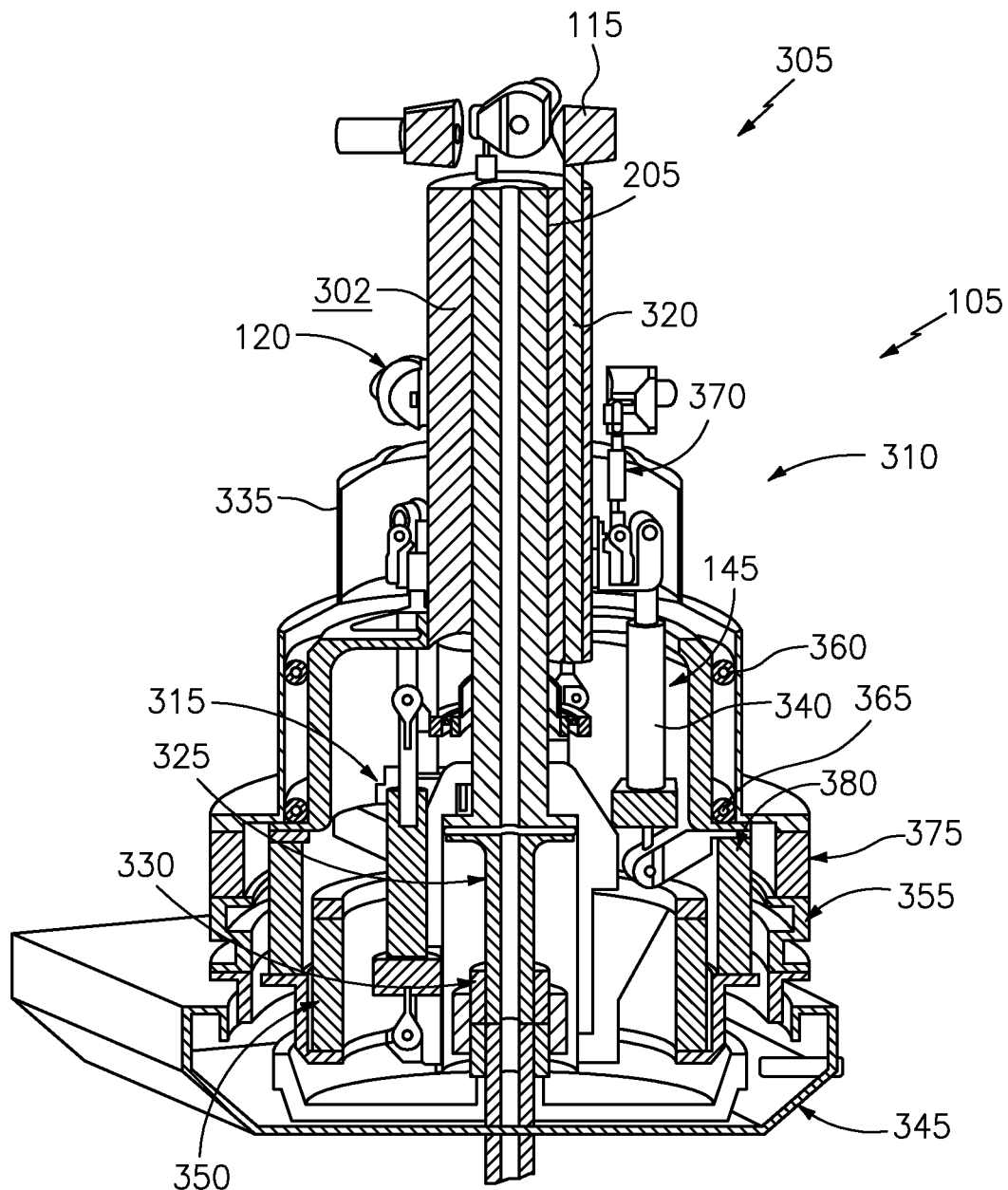
FIG. 3 illustrates a side-view cross-section of an exemplary embodiment of a co-axial rotor system with a detailed view of the stationary ground tube surrounding the upper shaft assembly.

FIG. 3 illustrates a perspective partial cross-sectional view of an exemplary embodiment of a rotor system 105 including a stationary ground tube 145, with a detailed view of the inner configuration of the ground tube 145 separating an upper rotor assembly 305 from the lower rotor assembly 310. Particularly, the upper rotor assembly 305 includes an upper hub 115 mounted to an upper rotor shaft 205 for driving the rotation of a plurality of upper rotor blades (not shown) that are connected to the upper hub 115. The upper hub 115 is also coupled to upper actuators, for example upper actuator 315 for controlling the collective pitch and cyclic pitch of the upper rotor blades (not shown) via adjustments made to the upper control rods 320. The upper rotor shaft 205 and upper control rods 320 are contained within an interior cavity 302 of the ground tube 145 while the lower rotor shaft 335 rotates outside the ground tube 145. Bearings 360, 365 may be provided for maintaining the position of the lower rotor shaft 335 with respect to the stationary ground tube 145 in addition to reduction of friction. Also, the upper rotor shaft 205 is coupled to a ground plate housing 345 through an upper shaft balance 325, an upper shaft coupling 330, and an upper balance 350.

Also shown in FIG. 3, the rotor system 105 includes a lower rotor assembly 310 having a lower hub 120 connected to a plurality of lower rotor blades (not shown). The lower hub 120 is coupled to a lower rotor shaft 335 for driving the rotation of the plurality of lower rotor blades. The lower hub 120 is also attached to lower actuators such as, for example, lower actuator 340 for controlling the collective and cyclic pitch of lower rotor blades through the adjustment of the lower control rod 370. Also, the lower rotor shaft 335 is coupled to a ground plate housing 345 through a lower balance 380, a lower shaft balance 375, and a lower shaft coupling 355.

The rotor system 105 also includes a non-rotating stationary ground tube 145 traversing the upper rotor assembly 305 and lower rotor assembly 310. Particularly, the ground tube 145 includes an interior cavity 302 for receiving the upper rotor shaft 205 and upper actuators 315 as well as lower actuators 340. Also, the upper and lower actuators 315, 340 respectively may traverse the ground tube 145 through one or more windows (shown in detail in FIG. 4) in order to provide for control of the collective and cyclic pitch while also maintaining the stationary position of the ground tube 145. The upper rotor shaft 205 rotates inside the interior cavity 302 of ground tube 145 thereby controlling the rotating of the upper hub 115 while the lower rotor shaft 335 rotates outside the ground tube 145, thereby causing the rotation of the lower hub 120 outside the ground tube. It is to be appreciated that the ground tube 145 is stationary with respect to the upper rotor assembly 305 and lower rotor assembly 310 and provides for a stationary platform for attachment of the wind fairing 140 (shown in FIGS. 1-2) without utilizing bearings to maintain the stationary position of wind fairing 140.

Figure 4:
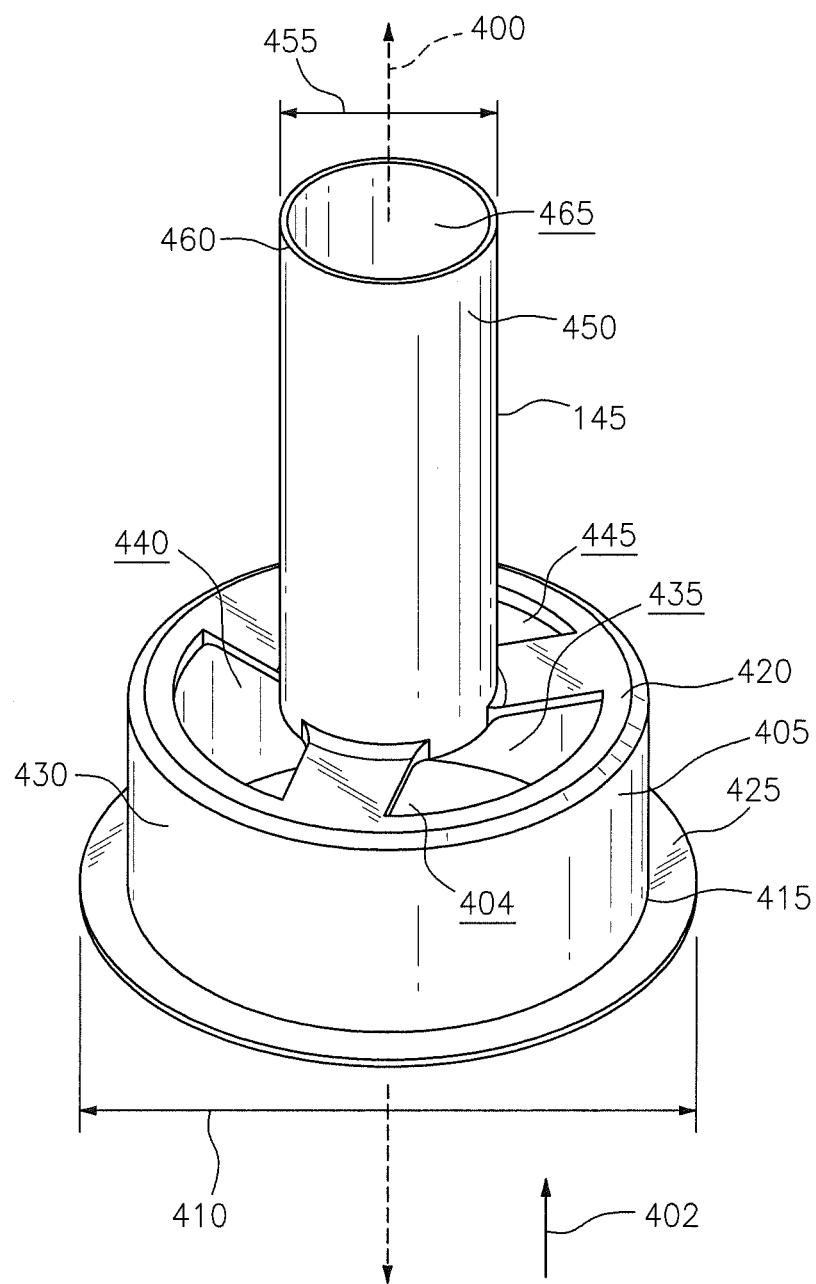
FIG. 4 illustrates a perspective view of the stationary ground tube shown in FIGS. 1-3 according to an exemplary embodiment of the invention.

FIG. 4 illustrates a perspective view of a ground tube 145 in accordance with an exemplary embodiment of the invention. Particularly, ground tube 145 includes a generally cylindrical-shaped portion 405 having an interior cavity 404 that is aligned along longitudinal axis 400 (i.e., portion 405 is cannulated). Portion 405 has a generally uniform outer diameter 410 from end 415 to end 420. In an exemplary embodiment, end 415 is open so as to provide access to interior cavity 404 in direction 402. Also, edge 425 is circumferentially coupled to outer surface 430 along end 415 so that edge 425 is orthogonal to a tangent at each point on the circumference of outer surface 430. In one exemplary embodiment, end 420 has a plurality of openings, such as opening 435, 440, and 445. Each opening 435, 440, 445 is provided to receive, in one exemplary embodiment, a lower actuator, such as lower actuator 340 (FIG. 3) in a typical co-axial rotor helicopter in order to control the collective and cyclic pitches of the axes of the rotating blades. In other embodiments, end 420 may include additional openings or no openings in order to accommodate design considerations of other rotor systems that may or may not include one or more lower actuators.

Also shown in FIG. 4, portion 405 is coupled to a generally tubular portion 450 at end 420. Particularly, portion 405 is of a uniform width 455 from end 420 to end 460 and includes an interior cavity 465 that is also aligned along longitudinal axis 400 (i.e., portion 450 is cannulated). Interior cavities 404, 465 provide a continuous volume within the ground tube 145 that may be accessed from end 425 or end 460. It is to be appreciated that the dimensions of the portion 405 and portion 450 are scalable based upon the size of the rotor system being utilized for a high-speed rotary-wing aircraft, with the dimensions of portions 405 independent to the dimensions of portion 450.

In operation and as shown in FIGS. 3 and 4, portion 450 provides for a stationary mounting point for wind fairing 140 (FIG. 2) by coupling ground tube 145 to the lower rotor assembly 310 (FIG. 3) in order to keep ground tube 145 stationary with respect to the upper rotor shaft 205 (FIG. 3) and lower rotor shaft 335 (FIG. 3), which are both Rotating. In order to achieve this stationary position, the ground tube 145 traverses the rotor assemblies so that portion 450 contains the rotating upper rotor shaft 205 (FIG. 3) within the interior volume formed by cavities 404, 465 while the lower rotor shaft 335 (FIG. 3) rotates outside the ground tube 145. Additionally, in one exemplary embodiment, openings 435, 440, and 445 are provided for lower actuator 340 (FIG. 3) to be coupled to lower rotor hub 120 (FIG. 3) for collective and cyclic control of the rotating blades connected to the lower rotor hub 120 (FIG. 3). However, it is to be appreciated that additional openings may be provided to implement additional actuators.

The technical effects and benefits of exemplary embodiments include a stationary ground tube for a wind fairing that results in a lower weight hub fairing system in a helicopter.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A wind fairing system for use in a rotor assembly comprising:
 an upper hub fairing configured for coupling to an upper hub of the rotor assembly;
 a lower hub fairing configured for coupling to a lower hub of the rotor assembly; and
 a wind fairing configured for coupling to a ground tube, the ground tube comprising:
  a first portion including a first through aperture aligned along a longitudinal axis, the first portion having a tubular body from an open first end to an opposed second end; and
  a second portion including a second through aperture from an open third end to an open fourth end, the second through aperture being aligned along the longitudinal axis, and the second portion being coupled to the first portion;

wherein the first portion and second portion of the ground tube are stationary in relation to both the upper hub and the lower hub.

2. The wind fairing system of claim 1, wherein the wind fairing is coupled to the ground tube.

3. The wind fairing system of claim 1, wherein the third end is coupled to the first portion at the second end.

4. The wind fairing system of claim 1, further comprising a circular ring member circumferentially coupled at the first end of the first portion.

5. The wind fairing system of claim 4, wherein the circular ring member is coupled to an exterior surface of the first portion.

6. The wind fairing system of claim 1, wherein the second end comprises one opening for receiving an actuator configured for controlling at least one of the lower hub and the upper hub.

7. A wind fairing system for use in a rotor assembly comprising:
   an upper hub fairing configured for coupling to an upper hub of the rotor assembly;
   a lower hub fairing configured for coupling to a lower hub of the rotor assembly; and
   a wind fairing configured for coupling to a ground tube, the ground tube comprising:
      a first portion including a first through aperture aligned along a longitudinal axis, the first portion having a tubular body from an open first end to an opposed second end; and
      a second portion including a second through aperture from an open third end to an open fourth end, the second through aperture being aligned along the longitudinal axis, and the second portion being coupled to the first portion;
   wherein the second end comprises a predefined number of openings configured for receiving a plurality of actuators, the predefined number coincides with a number of actuators in the plurality of actuators.

8. The wind fairing system of claim 1, wherein the first through aperture and the second through aperture form a continuous opening within the stationary ground tube.

9. The wind fairing system of claim 1, wherein the second portion is configured for receiving an upper rotor shaft within the second through aperture.

10. A wind fairing system for use in a rotor assembly comprising:
    an upper hub fairing configured for coupling to an upper hub of the rotor assembly;
    a lower hub fairing configured for coupling to a lower hub of the rotor assembly; and
    a wind fairing configured for coupling to a ground tube, the ground tube comprising:
       a first portion including a first through aperture aligned along a longitudinal axis, the first portion having a tubular body from an open first end to an opposed second end; and
       a second portion including a second through aperture from an open third end to an open fourth end, the second through aperture being aligned along the longitudinal axis, and the second portion being coupled to the first portion
    wherein the first portion and the second portion reside within a lower rotor shaft, the lower rotor shaft configured to drive the lower hub.

11. A stationary ground tube for a coaxial rotor fairing comprising:
    a first portion including a first through aperture aligned along a longitudinal axis, the first portion having a tubular body from an open first end to an opposed second end; and
    a second portion including a second through aperture from an open third end to an open fourth end, the second through aperture being aligned along the longitudinal axis, and the second portion being coupled to the first portion;
    wherein the second portion is coupled to the coaxial rotor fairing;
    wherein the second end comprises a predefined number of openings configured for receiving a plurality of actuators, the predefined number coincides with a number of actuators in the plurality of actuators.

12. The stationary ground tube of claim 11, wherein the third end is coupled to the first portion at the second end.

13. The stationary ground tube of claim 11, further comprising a circular ring member circumferentially coupled at the first end of the first portion.

14. The stationary ground tube of claim 13, wherein the circular ring member is coupled to an exterior surface of the first portion.

15. The stationary ground tube of claim 11, wherein the second end comprises one opening for receiving an actuator configured for controlling at least one of the lower hub and the upper hub.

16. The stationary ground tube of claim 11, wherein the first through aperture and the second through aperture form a continuous opening within the stationary ground tube.

17. The stationary ground tube of claim 11, wherein the second portion is configured for receiving an upper rotor shaft within the second through aperture.

18. A stationary ground tube for a coaxial rotor fairing comprising:
    a first portion including a first through aperture aligned along a longitudinal axis, the first portion having a tubular body from an open first end to an opposed second end; and
    a second portion including a second through aperture from an open third end to an open fourth end, the second through aperture being aligned along the longitudinal axis, and the second portion being coupled to the first portion;
    wherein the second portion is coupled to the coaxial rotor fairing;
    wherein the first portion and the second portion resides within a lower rotor shaft, the lower rotor shaft configured to drive a lower hub of a rotor assembly.

* * * * *